(12) United States Patent
Nishida

(10) Patent No.: US 8,212,538 B2
(45) Date of Patent: Jul. 3, 2012

(54) HYSTERETIC SWITCHING REGULATOR AND CONTROL METHOD USED THEREIN

(75) Inventor: Junji Nishida, Neyagawa (JP)

(73) Assignee: Ricoh Company, Ltd., Tokyo (JP)

( * ) Notice: Subject to any disclaimer, the term of this patent is extended or adjusted under 35 U.S.C. 154(b) by 393 days.

(21) Appl. No.: 12/629,397

(22) Filed: Dec. 2, 2009

(65) Prior Publication Data

US 2010/0134085 A1    Jun. 3, 2010

(30) Foreign Application Priority Data

Dec. 3, 2008 (JP) ................. 2008-308613

(51) Int. Cl.
G05F 1/56 (2006.01)
(52) U.S. Cl. .................... 323/271; 323/288
(58) Field of Classification Search .......... 323/222, 323/224, 266, 267, 271, 272, 280, 282–286, 323/288; 363/21.07, 21.18, 61, 98, 21.13, 363/45

See application file for complete search history.

(56) References Cited

U.S. PATENT DOCUMENTS

| | | | |
|---|---|---|---|
| 6,229,293 B1 * | 5/2001 | Farrenkopf | 323/288 |
| 6,583,610 B2 * | 6/2003 | Groom et al. | 323/288 |
| 6,628,109 B2 * | 9/2003 | Rincon-Mora | 323/282 |
| 7,233,469 B2 * | 6/2007 | Vinciarelli et al. | 361/78 |
| 7,319,311 B2 | 1/2008 | Nishida | |
| 7,482,791 B2 * | 1/2009 | Stoichita et al. | 323/271 |
| 7,504,805 B2 | 3/2009 | Nishida | |
| 7,576,527 B1 * | 8/2009 | Zhang et al. | 323/284 |
| 7,605,573 B2 | 10/2009 | Nishida | |
| 2007/0176588 A1 | 8/2007 | Nishida | |

FOREIGN PATENT DOCUMENTS

| | | |
|---|---|---|
| JP | 2006-34033 | 2/2006 |
| JP | 2006-121845 | 5/2006 |
| JP | 2006-246626 | 9/2006 |
| JP | 2007-82347 | 3/2007 |
| JP | 2007-110833 | 4/2007 |
| JP | 2007-159395 | 6/2007 |
| JP | 2007-202273 | 8/2007 |
| JP | 2007-202281 | 8/2007 |
| JP | 2007-209103 | 8/2007 |
| JP | 2007-209135 | 8/2007 |
| JP | 2007-209180 | 8/2007 |
| JP | 2007-241411 | 9/2007 |
| JP | 2007-252137 | 9/2007 |
| JP | 2008-72786 | 3/2008 |
| JP | 2008-72833 | 3/2008 |
| JP | 2008-72835 | 3/2008 |
| JP | 2008-178263 | 7/2008 |

* cited by examiner

*Primary Examiner* — Rajnikant Patel
(74) *Attorney, Agent, or Firm* — Cooper & Dunham LLP (57) ABSTRACT

A switching regulator includes a switching transistor, an inductor, a feedback voltage generator, a hysteresis comparator circuit, and a feedback loop circuit. The switching transistor alternately switches on and off. The inductor charges when the switching transistor is on. The feedback voltage generator generates a first feedback voltage by dividing an output voltage. The hysteresis comparator circuit has a voltage comparator to compare the first feedback voltage against a reference voltage to output a comparator output signal as a result of the comparison. The feedback loop circuit feeds the comparator output signal back to the feedback voltage generator to generate a second feedback voltage. The first feedback voltage has an alternating current component substantially dependent on the second feedback voltage varying with the comparator output signal.

20 Claims, 4 Drawing Sheets

HYSTERETIC SWITCHING REGULATOR AND CONTROL METHOD USED THEREIN

BACKGROUND OF THE INVENTION

1. Technical Field

The present invention relates to a hysteretic switching regulator and a control method thereof, and more particularly, to a variable-output, hysteretic switching voltage regulator having an operating frequency insensitive to variations in input and output voltages and a control method for use in such a voltage regulator.

2. Discussion of the Background

With currently increasing concern for environmental and ecological issues, there is a growing need for power-efficient electronic equipment. Reducing power consumption is doubly important for battery-powered electronic devices, such as mobile phones and digital cameras, since it not only contributes to preserving the environment but also extends the lifetime of batteries commonly used in such hand-held portable electronics.

On the other hand, most modern electronic products process large amounts of data as they become capable of recording, processing, and displaying still pictures as well as videos with sounds. The sophistication of multimedia electronic devices requires faster processing capabilities, and thus involves higher-performance and higher-speed hardware components such as central processing units (CPUs) operating with clock signals of ever-increasing frequencies. However, using a faster clock signal often results in a larger amount of power required to operate an electronic circuit, since power consumption in individual circuit components increases proportionally to the clock rate at which they are operated. Moreover, generating high frequency clock pulses itself requires a high voltage power supply.

To simultaneously satisfy both these energy-saving and fast-processing requirements, current battery-powered electronic devices have been developed featuring two modes of operation: a low-power mode in which they operate with a relatively slow clock signal and a relatively low power supply voltage to reduce power consumption, and a high-performance mode in which they use a relatively fast clock signal and a relatively high power supply voltage to enable fast processing of vast amounts of data. Switching the operation mode depending on the task being executed (e.g., using high-performance mode only when processing video data) minimizes the overall power consumption in these dual-mode electronics.

Not surprisingly, such dual-mode capability requires an appropriate power supply circuit for proper operation. To date, inductor-based, non-isolated switching regulators are widely used in battery-powered electronic devices due to their compact size and high energy efficiency, which uses a switching element or transistor alternately turning on and off current flow therethrough to temporarily charge and discharge an inductor to generate a constant output voltage.

One particular type of switching regulator is a hysteretic regulator that incorporates a hysteresis comparator to compare an output feedback voltage against a reference voltage with a certain amount of hysteresis. Hysteretic switching regulators are suitable for applications in dual-mode electronic devices such as those described above, where fast responsiveness to transient changes in load current, adjusting an output voltage according to a voltage-setting signal, and reducing energy consumption during low-power mode operation are highly required.

Conventionally, a hysteretic voltage regulator uses a resistor connected in series with an inductor to detect a current flowing through the inductor for control of an output voltage through a feedback control loop. A drawback encountered by such a conventional design is that using a current sensing resistor affects current-voltage characteristics and results in significant power dissipation, leading to low power conversion efficiency of the voltage regulator. Other drawbacks include a relatively large amount of ripple voltage superimposed on the output voltage, and variations in the operating frequency caused by variations in input and output voltages.

Figure 1:
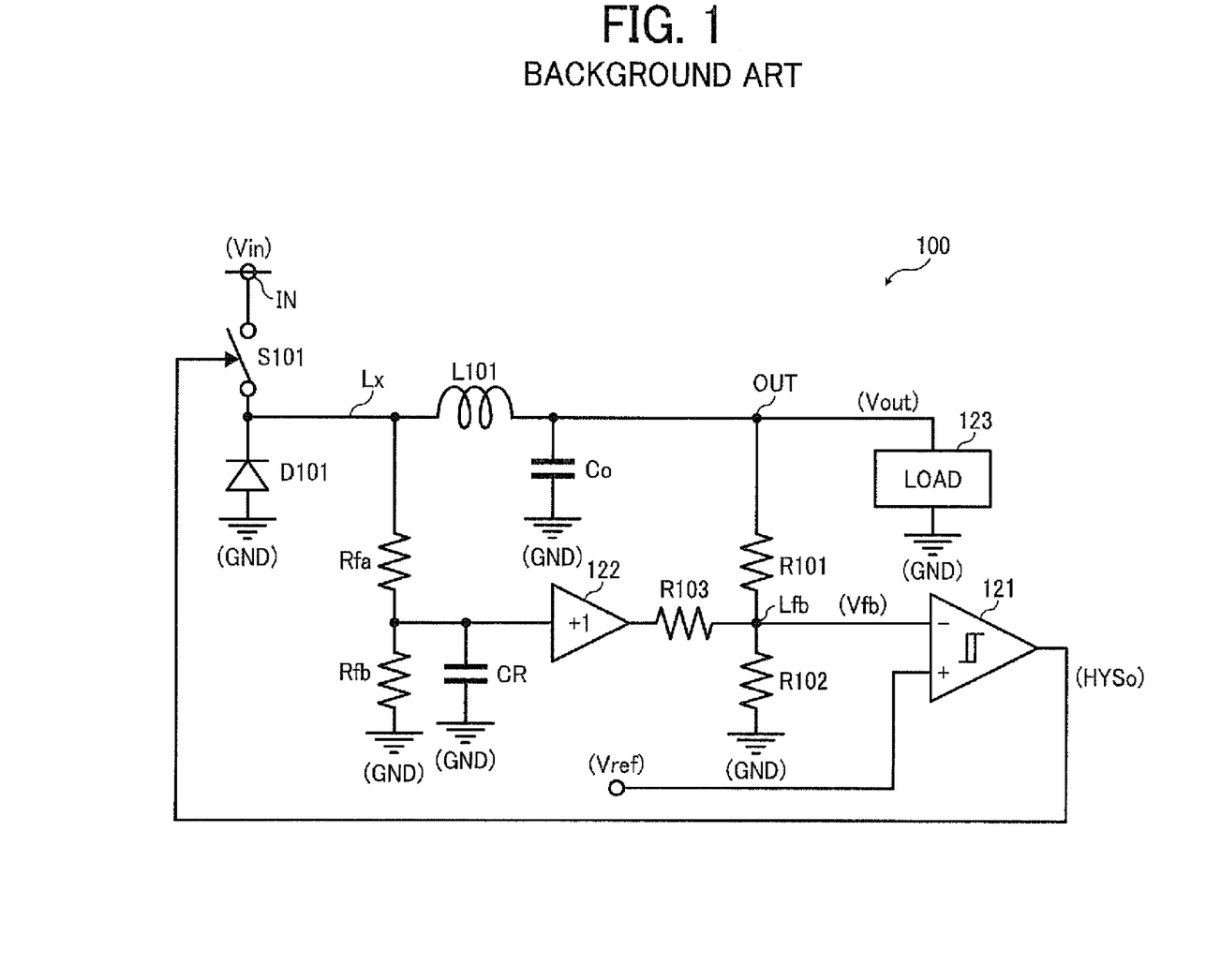
FIG. 1 is a circuit diagram illustrating a conventional hysteretic switching regulator.

Several methods have been proposed to address drawbacks of conventional hysteretic switching regulators. For example, one approach is to use a low-pass filter to feed an alternating current component to a feedback control loop, which eliminates the need for a current sensing resistor connected in series with an inductor. FIG. 1 is a circuit diagram illustrating a hysteretic switching regulator 100 having such a low-pass filter instead of a current sensing resistor in a feedback control loop.

As shown in FIG. 1, the switching regulator 100 includes an output stage formed of a switch S101 and a rectifier D101 connected in series between an input terminal IN and ground GND, and an inductor L101 having one end connected to a switch node Lx between the switch S101 and the rectifier D101 and another end connected to an output capacitor Co and an output terminal OUT. Also included are a pair of resistors R101 and R102 connected in series between the output terminal OUT and ground GND, as well as a hysteresis comparator 121 with an inverting input connected to a feedback node Lfb between the resistors R101 and R102, a non-inverting input connected to a reference voltage generator, and an output connected to a control terminal of the switch S101, which together form a feedback control loop to control operation of the regulator output stage.

During operation, the switch 101 alternately switches on and off current flow therethrough according to a control signal HYSo to convert an input voltage Vin supplied to the input terminal IN to generate an output voltage Vout at the output terminal OUT for output to a load circuit LOAD. The output voltage Vout is monitored by the resistors R101 and R102 which divides the voltage Vout to generate a feedback voltage Vfb at the feedback node Lfb for input to the hysteresis comparator 121. The comparator 121 compares the incoming signal Vfb against a reference voltage Vref to generate the control signal HYSo, in which it exhibits a certain amount of hysteresis voltage Vhys for switching the output signal HYSo between high and low levels.

Specifically, when the output voltage Vout decreases to cause the feedback voltage Vfb to fall below the reference voltage Vref, the output of the hysteresis comparator 121 becomes high to turn on the switch 101. This results in a current flowing from the input terminal IN to the load circuit LOAD through the inductor L101, while charging the inductor L101 as well as the capacitor Co to gradually increase the output voltage Vout.

Then, as the output voltage Vout increases sufficiently to cause the feedback voltage Vfb to exceed the reference voltage Vref plus the hysteresis voltage Vhys, the output of the hysteresis comparator 121 becomes low to turn off the switch 101. This results in the voltage at the switch node Lx falling below the ground voltage GND due to a counter-electromotive force developed across the inductor L101, which in turn causes a current to flow from the ground GND to the inductor L101 through the rectifier D101, while discharging the inductor L101 and the capacitor Co to gradually decrease the output voltage Vout.

When the output voltage Vout sufficiently decreases to again cause the feedback voltage Vfb to fall below the reference voltage Vref, the above cycle repeats to continue voltage regulation.

Thus, during operation of the hysteretic switching regulator 100, the feedback voltage Vfb oscillates between its lower threshold Vref and upper threshold Vref+Vhys. In general, an oscillating feedback voltage in a hysteretic regulator creates a ripple voltage equal to vhys*(r101+r102)/r102 superimposed on an output voltage, where vhys is a hysteresis voltage, and r101 and r102 are resistances of voltage divider resistors generating the feedback voltage. Such a ripple voltage can be considerable and can adversely affect proper operation of a load circuit connected to an output terminal of the hysteretic regulator.

To reduce the voltage ripple at the output terminal OUT, the hysteretic regulator 100 additionally incorporates a pair of feedback resistors Rfa and Rfb connected in series between the switch node Lx and ground GND, and a capacitor CR connected in parallel with the resistor Rfb, which together form a low-pass filter connected to the feedback node Lfb through a series circuit composed of a unity gain buffer 122 and a resistor R103.

During voltage regulation, the low-pass filter converts a rectangular waveform generated at the switch node Lx into a triangular waveform, which is added to a waveform proportional to the output voltage Vout to generate the feedback voltage Vfb at the feedback node Lfb. Operating parameters of the hysteretic regulator 100 are selected so that the feedback voltage Vfb has its alternating current (AC) component dependent on variations in the voltage at the switch node Lx rather than the output voltage Vout.

According to this method, feeding the voltage at the switch node Lx back to the comparator input through the low-pass filter and the buffer 122 allows the hysteresis comparator 121 to switch its output HYSo to turn on/off the switch S101 before the output voltage Vout significantly varies from its nominal value, resulting in a relatively small amount of ripple voltage superimposed on the output voltage Vout.

However, the above-described switching regulator 100 still has several drawbacks. For example, the operating frequency of the switch S101 can vary significantly as the input voltage Vin varies. This is because the input voltage Vin determines the voltage at the switch node Lx, which in turn determines the AC component of the feedback voltage Vfb supplied to the hysteresis comparator 121 generating the switch control signal HYSo.

Another drawback is high costs involved in using the unity gain buffer 122 in the switching regulator 100, which is designed to operate with relatively high switching frequencies to meet today's requirements for high efficiency and compact power supply circuitry. That is, when operated at a high switching frequency, the analog buffer 122 consumes large amounts of power and requires a relatively large circuit area for proper phase compensation, which can negate some advantages of using a switching voltage regulator.

BRIEF SUMMARY

This disclosure describes a novel non-isolated hysteretic switching regulator that converts an input voltage supplied to an input terminal into a variable-output voltage output to an output terminal.

In one aspect of the disclosure, the novel switching regulator includes a switching transistor, an inductor, a feedback voltage generator, a hysteresis comparator circuit, and a feedback loop circuit. The switching transistor alternately switches on and off current flow therethrough. The inductor charges at the input voltage when the switching transistor is on, and discharges when the switching transistor is off. The feedback voltage generator generates a first feedback voltage at a first feedback node by dividing the output voltage. The hysteresis comparator circuit has a voltage comparator to compare the first feedback voltage against a reference voltage to output a comparator output signal as a result of the comparison. The feedback loop circuit feeds the comparator output signal back to the feedback voltage generator to generate a second feedback voltage at a second feedback node. The first feedback voltage has an alternating current component substantially dependent on the second feedback voltage varying with the comparator output signal.

This disclosure also describes a novel control method for use in a non-isolated hysteretic switching regulator that converts an input voltage supplied to an input terminal into a variable output voltage output to an output terminal.

In one aspect of the disclosure, the switching regulator includes a switching transistor, an inductor, and a rectifier. The switching transistor alternately switches on and off current flow therethrough according to a switching control signal applied to a control terminal thereof. The inductor charges at the input voltage when the switching transistor is on, and discharges when the switching transistor is off. The rectifier passes current flow therethrough when the inductor discharges. The novel control method includes steps of feedback voltage generation, voltage comparison, control signal generation, and comparison result feedback. The feedback voltage generation generates a first feedback voltage by dividing the output voltage through multiple resistors connected in series. The voltage comparison compares the first feedback voltage against a reference voltage to output a result of the comparison. The control signal generation generates the switching control signal based on the comparison result. The comparison result feedback feeds the comparison result back to the feedback voltage generation to generate a second feedback voltage. The first feedback voltage has an alternating current component substantially dependent on the second feedback voltage varying with the comparison result.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, examples and exemplary embodiments of this disclosure are described.

Figure 2:
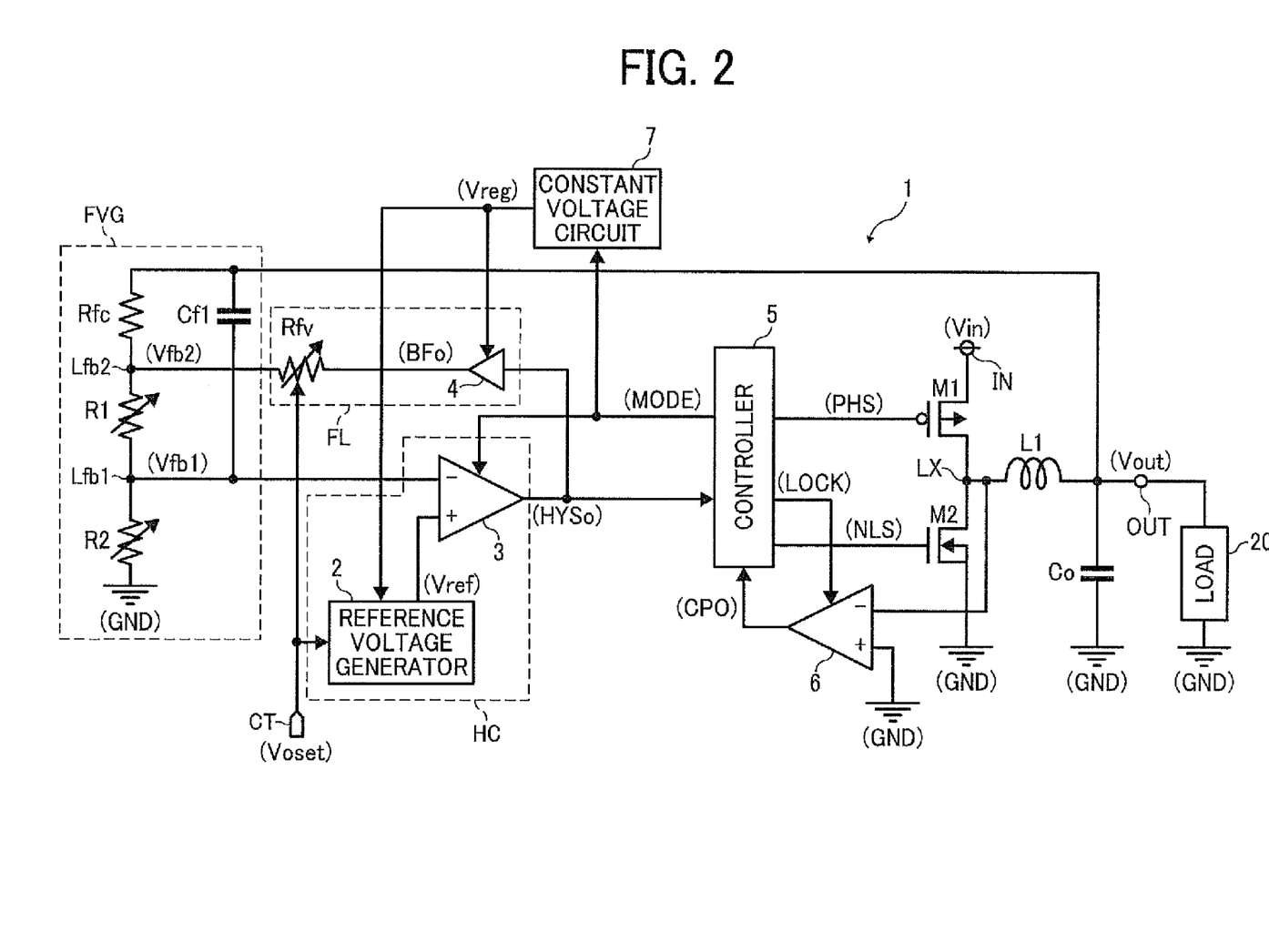
FIG. 2 is a circuit diagram illustrating a hysteretic switching regulator according one embodiment of this patent specification.

FIG. 2 is a circuit diagram illustrating a hysteretic switching regulator 1 according one embodiment of this patent specification.

As shown in FIG. 2, the hysteretic switching regulator 1 is a non-isolated, variable-output step-down or buck voltage regulator with synchronous rectification, which converts an input voltage Vin supplied to an input terminal IN into an output voltage Vout for output to an output terminal OUT supplying power to a load circuit LOAD, with the output voltage Vout being lower than the input voltage Vin and adjustable to a desired level through a voltage setting signal Voset input to a control terminal CT from an appropriate signal source, not shown.

The switching regulator 1 includes an output stage formed of a switching transistor M1 and a synchronous rectifier transistor M2, the former being a P-channel metal-oxide semiconductor (PMOS) transistor and the latter an N-channel metal-oxide semiconductor (NMOS) transistor, as well as an inductor L1 and an output capacitor Co. Also included are a constant feedback resistor Rfc, a pair of variable voltage divider resistors R1 and R2, a feedback capacitor Cf1, a reference voltage generator 2, a voltage comparator 3, a variable feedback loop resistor Rfv, a buffer 4, a controller 5, a backflow detector comparator 6, and a constant voltage circuit 7, which together form a feedback control loop to control operation of the regulator output stage.

The resistors Rfc, R1, and R2, and the capacitor Cf1 form a feedback voltage generator FVG, the reference voltage generator 2 and the voltage comparator 3 form a hysteresis comparator circuit HC, and the resistor Rfv and the buffer 4 form a secondary, feedback loop circuit FL in the hysteretic switching regulator 1 according to this patent specification.

All the components listed above except for the inductor L1 and the output capacitor Co, or those except for the switching transistor M1 and/or the synchronous rectifier transistor M2 as well as the inductor L1 and the output capacitor C1, may be integrated into a single integrated circuit (IC) to construct the switching regulator 1.

In the output stage of the switching regulator 1, the switching transistor M1 and the synchronous rectifier transistor M2 are connected in series between the input terminal Vin and a ground GND, each having a gate or control terminal connected to the controller 5. The inductor L1 has one end connected to the output terminal OUT and another end connected to a switch node LX between the transistors M1 and M2, and the output capacitor Co is connected between the output terminal OUT and the ground GND.

The controller 5 applies a switching control signal PHS to the gate of the PMOS transistor M1 and a rectification control signal NLS to the gate of the NMOS transistor M2. The signal PHS causes the transistor M1 to alternately switch on and off current flow therethrough from the input terminal IN to the inductor L1, and the signal NLS causes the transistor M2 to alternately switch on and off current flow therethrough from the ground GND to the inductor L1.

The series transistors M1 and M2 operate complementarily to each other, that is, the transistor M1 turn on as the transistor M2 turns off to charge the inductor L1 at the input voltage Vin, and the transistor M2 turns on as the transistor M1 turns off to discharge the inductor L1. The output stage thus performs voltage regulation with synchronous rectification to obtain the output voltage Vout, which is output from the output terminal OUT to drive the load circuit 20.

In the feedback voltage generator FVG, the constant feedback resistor Rfc, the first voltage divider resistor R1, and the second voltage divider resistor R2 are connected in series between the output terminal OUT and the ground GND (i.e., in parallel with the output capacitor Co), forming a first feedback node Lfb1 between the resistors R1 and R2, and a second feedback node Lfb2 between the resistors R1 and Rfc. The feedback capacitor Cf1 is connected between the output terminal OUT and the first feedback node Lfb1 in parallel with the resistors R1 and Rfc.

The feedback voltage generator FVG divides the output voltage Vout to generate a first feedback voltage Vfb1 at the first feedback node Lfb1 and a second feedback voltage Vfb2 at the second feedback node Lfb2. As will be described later in more detail, the first feedback voltage Vfb1 has an average signal level or direct current (DC) component substantially dependent on the output voltage Vout and an alternating current (AC) component substantially dependent on the second feedback voltage Vfb2. The first feedback voltage Vfb1 is output to the hysteresis comparator circuit HC.

The constant voltage circuit 7 is a power supply circuit with a control input connected to the controller 5, and a power supply output connected to the hysteresis comparator circuit HC and the feedback loop circuit FL, respectively. Under control of the controller 5, the constant voltage circuit 7 energizes the reference voltage generator 2 and the buffer 4 with a regulated constant voltage Vreg.

In the hysteresis comparator circuit HC, the reference voltage generator 2 has an input connected to the control terminal CT and an output connected to the hysteretic voltage comparator 3. The comparator 3 has an inverting input connected to the first feedback node Lfb1, a non-inverting input connected to the output of the reference voltage generator 2, and an output connected to the controller 5 and the feedback loop circuit FL, respectively.

The reference voltage generator 2 is a digital-to-analog converter that generates a variable reference voltage Vref according to the voltage setting signal Voset for output to the hysteresis comparator 3. The voltage comparator 3 compares the first feedback voltage Vfb1 against the reference voltage Vref to output a binary signal HYSo switching between high and low levels to indicate the comparison results for output to the controller 5 as well as to the feedback loop circuit FL.

In the feedback loop circuit FL, the buffer 4 has an input connected to the output of the voltage comparator 3 and an output connected to the variable feedback resistor Rfv. The variable feedback resistor Rfv is connected between the output of the buffer 4 and the second feedback node Vfb2, and has a control input connected to the control terminal CT.

The buffer 4 generates a buffered signal BFo for output to the second feedback node Lfb2 through the variable resistor Rfv, whose signal level switches between upper and lower levels VOH and VOL in sync with the switching of the comparator output HYSo. With the buffer 4 deriving power from the constant voltage circuit 7, the upper limit VOH of the buffer output BFo is substantially equal to the constant voltage Vreg and the lower limit VOL is substantially equal to the ground voltage GND. The variable feedback resistor Rfv has its resistance adjusted through the voltage setting signal Voset according to which the hysteresis comparator circuit HC adjusts the output voltage Vout to a desired level.

In such a configuration, the feedback loop circuit FL serves to feed the output HYSo of the hysteresis comparator 3 to the feedback voltage generator FVG to cause changes in the first feedback voltage Vfb1 by varying the ratio of voltage division through the resistors Rfc, R1, and R2.

Specifically, when the buffer output BFo switches to the lower limit VOL equal to the ground GND, the feedback resistor Rfv connects to the second feedback node Lfb2 in parallel with the resistors R1 and R2, so that the feedback voltage Vfb1 decreases to a lower threshold voltage VL. Contrarily, when the buffer output BFo switches to the higher limit VOH equal to the constant voltage Vreg, the feedback resistor Rfv connects to the second feedback node Lfb2 in series with the resistors R1 and R2, so that the feedback voltage Vfb1 increases to an upper threshold voltage VH.

Such changes in the feedback voltage Vfb1 take place gradually owing to the feedback capacitor Cf1 connected in parallel with the resistors Rfc and R1. As a result, the hysteresis comparator 3 exhibits a hysteresis voltage Vhys equal to a difference between the upper and lower thresholds VH and VL of the feedback voltage Vfb1, the value of which is dependent on a rate of change in the feedback voltage Vfb1 and a response delay of the comparator 3.

The buffer 4 used in the feedback loop circuit FL may be a digital buffer of simple structure, such as one obtained by connecting two inverter gates in series. Using a simple digital buffer enables low-cost implementation of the switching regulator 1, since it can operate at higher frequencies without consuming large amounts of energy in contrast to a conventional configuration using an analog buffer circuit.

Figure 3:
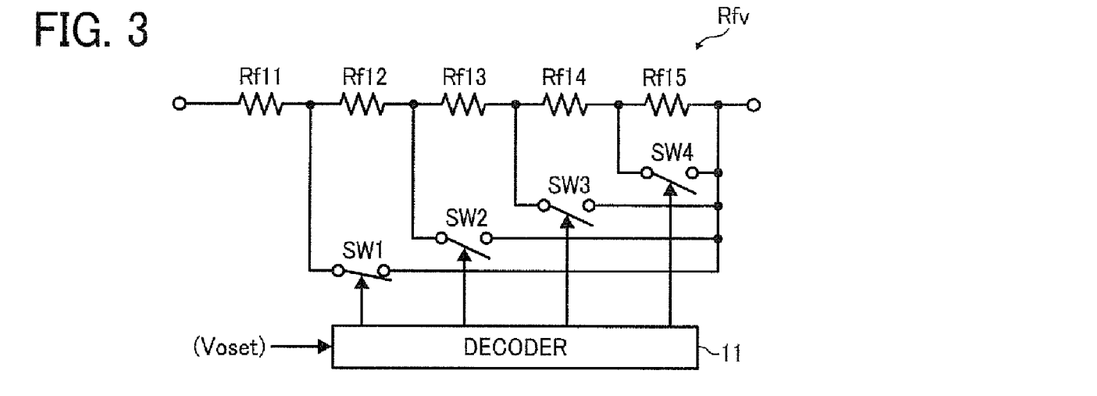
FIG. 3 is a circuit diagram illustrating an example of a variable feedback resistor used in the hysteretic switching regulator of FIG. 2.

The variable feedback resistor Rfv for use in the feedback loop circuit FL may be configured using a suitable existing or currently developed technique, one example of which is schematically illustrated in a circuit diagram of FIG. 3.

As shown in FIG. 3, the variable feedback resistor Rfv may be formed of multiple resistors Rf11 through Rf15 connected in series, with multiple switches SW1 through SW4 each having one end connected to a node between two adjoining resistors and another end connected to the end of the series resistor circuit. The resistor Rfv has a decoder 11 to decode the voltage setting signal Voset into multiple separate signals, which selectively turns on and off the switches SW1 through SW4 to obtain a desired resistance through one or more of the series resistors Rf11 through Rf15. Alternatively, the operation of the feedback resistor Rfv may be controlled directly by the input signal Voset with appropriate configuration instead of the decoder 11.

Referring back to FIG. 2, the backflow detector comparator 6 has an inverting input connected to the switch node LX, a non-inverting input connected to the ground GND, and an output connected to the controller 5. The comparator 6 compares the voltage at the node LX against the ground voltage GND to generate a backflow detection signal CPO for output to the controller 5, indicating when a current backflow (i.e., a current flowing across the synchronous rectifier transistor M2 from the node LX to the ground GND) occurs or is likely to occur.

The controller 5 generates the control signals PHS and NLS according to the hysteresis comparator output HYSo and the backflow current detection signal CPO to control the output transistors M1 and M2 as described above. Also, the controller 5 generates an enable signal LOCK for output to a control terminal of the backflow detector comparator 6 and a mode switching signal MODE for output to a control terminal of the hysteresis comparator 3 and to the constant voltage circuit 7, respectively.

Upon detection of a backflow current by the backflow detector comparator 6, the controller 5 invalidates the enable signal LOCK to deactivate the backflow current detector comparator 6, and switches the mode switching signal MODE to reduce the amount of bias current supplied to the hysteresis comparator 3. As will be described later in more detail, this changes operation mode of the switching regulator 1 from a high-speed mode in which the transistors M1 and M2 switch at a relatively high frequency to consume a relatively high amount of power, to a low-power mode where the transistors M1 and M2 switch at a relatively low frequency to consume a relatively low amount of power, resulting in increased power efficiency of the hysteretic switching regulator 1.

Figure 4:
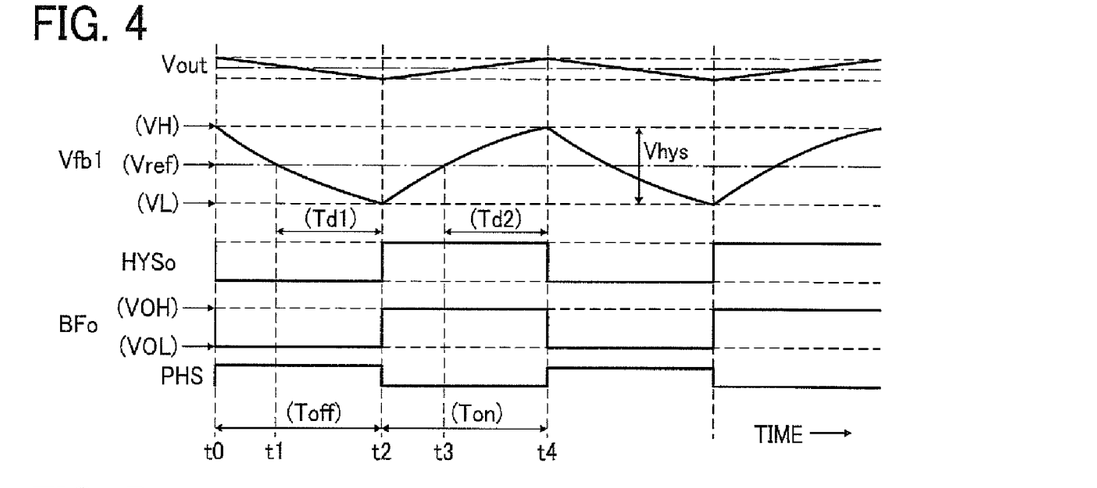
FIG. 4 is a timing chart showing typical waveforms of signals in the hysteretic switching regulator of FIG. 2 during high-speed mode operation.

FIG. 4 is a timing chart showing typical waveforms of the signals Vout, Vfb1, HYSo, BFo, and PHS in the hysteretic switching regulator 1 during high-speed mode operation.

As shown in FIG. 4, the first feedback voltage Vfb1 oscillates between the upper threshold VH and the lower threshold VL around the reference voltage Vref, with the hysteresis voltage Vhys obtained as the difference between VL and VH. The comparator output HYSo alternately switches between high and low levels, and the buffer output BFo switches in sync with the signal HYSo between the upper limit VOH substantially equal to the voltage Vreg and the lower limit VOL substantially equal to the ground voltage GND.

The control signal PHS for the switching transistor M1 switches according to the comparator output HYSo, going low as the signal HYSo goes high, and going high as the signal HYSo goes low. Although not depicted in the drawing, the control signal NLS for the synchronous rectifier transistor M2 switches in unison with the switching control signal PHS, going low as the signal HYSo goes high, and going high as the signal HYSo goes low.

Specifically, at time t0, the comparator output HYSo goes from high to low. This causes the control signal PHS to go high to turn off the switching transistor M1, and the control signal NLS to go high to turn on the synchronous rectifier transistor M2, allowing a current to flow into the inductor L1 from the ground GND. As the inductor current gradually decreases to fall below a current output to the load circuit LOAD, the output capacitor Co starts to discharge power to the load circuit LOAD. As a result, the output voltage Vout gradually decreases toward a desired setpoint.

With the comparator output HYSo going low at time t0, the buffer output BFo switches to the lower level VOL substantially equal to the ground voltage GND. As mentioned, this connects the variable feedback resistor Rfv in parallel with the voltage divider resistors R1 and R2 to change the ratio of voltage division so that the feedback voltage Vfb1 decreases from the upper threshold VH to the lower threshold VL. Also as mentioned, such a decrease in the feedback voltage Vfb1 takes place gradually owing to the feedback capacitor Cf1 connected across the resistors Rfc and R1.

At time t1, the feedback voltage Vfb1 crosses from above to below the reference voltage Vref. Upon sensing this, the hysteresis comparator 3 starts to switch the output signal HYSo from low to high. Since the comparator 3 has an inherent delay from its input to output, raising the signal level HYSo requires a delay time Td1 to come into effect, during which the feedback voltage Vfb1 continues decreasing to reach the lower threshold VL.

At time t2, the comparator output HYSo goes from low to high. This causes the control signal PHS to go low to turn on the switching transistor M1, and the control signal NLS to go low to turn off the synchronous rectifier transistor M2, allowing a current to flow into the inductor L1 from the input terminal IN. As a result, the output voltage Vout gradually increases toward the desired setpoint.

With the comparator output HYSo going high at time t2, the buffer output BFo switches to the higher level VOH substantially equal to the constant voltage Vreg. As mentioned, this connects the variable feedback resistor Rfv in series with the voltage divider resistors R1 and R2 to change the ratio of voltage division so that the feedback voltage Vfb1 increases from the lower threshold VL to the upper threshold VH. Such an increase in the feedback voltage Vfb1 takes place gradually owing to the feedback capacitor Cf1 connected across the resistors Rfc and R1.

At time t3, the feedback voltage Vfb1 crosses from below to above the reference voltage Vref to cause the comparator 3 to switch the output signal HYSo from high to low. As in the case of low-to-high transition, lowering the signal level HYSo requires a delay time Td2 to come into effect due to the inherent delay of the comparator 3, during which the feedback voltage Vfb1 continues to increase to reach the upper limit VH.

At time t4, the comparator output HYSo again goes low to initiate another switching cycle of the switching transistor M1, after which the process depicted above is repeated to maintain the output voltage Vout substantially at the desired setpoint.

Thus, the hysteretic switching regulator 1 according to this patent specification feeds the hysteresis comparator output HYSo back to the feedback voltage generator FVG through the feedback loop circuit FL, wherein the feedback voltage Vfb1 at the first feedback node Lfb1 varies with time around the reference voltage Vref proportional to the output voltage Vout depending on the amount of feedback as represented by the second feedback voltage Vfb2. In other words, the first feedback voltage Vfb1 has its DC component substantially dependent on the output voltage Vout and AC component substantially dependent on the second feedback voltage Vfb2. This results in an extremely small amount of ripples superimposed on the output voltage Vout, compared to those observed in a conventional hysteretic regulator.

Further, with the feedback control loop feeding the DC component of the output voltage Vout to the feedback voltage generator FVG, the switching regulator 1 requires no resistor connected in series with the inductor for sensing an inductor current. This effectively prevents the output voltage Vout from significantly decreasing as the load current increases, which is the case in a conventional configuration using a series resistor for current detection.

In addition to being capable of reducing ripple voltage, the hysteretic switching regulator 1 according to this patent specification features a stable operating frequency that is intrinsically independent of variations in the input voltage Vin, and is maintained substantially constant against changes in the output voltage Vout. The following describes the basis and principles upon which the switching regulator 1 maintains its stable operating frequency.

To calculate the operating frequency of the switching regulator 1, it is assumed that the switching transistor M1 is shut off during an off-time Toff in which the first feedback voltage Vfb1 decreases from the upper threshold VH to the lower threshold VL (i.e., between time t0 and time t2 in FIG. 4), and remains conductive during an on-time Ton in which the first feedback voltage Vfb1 increases from the lower threshold VL to the upper threshold VH (i.e., between time t2 and time t4 in FIG. 4).

Assuming no ripple voltage superimposed on the output voltage Vout, the on- and off-times Ton and Toff of the switching transistor M1 are given by the following equations Eq. 1 and Eq. 2, respectively:

$$Ton = r1 * cf1/A * \ln[(-VL+B/A)/(-VH+B/A)] \qquad \text{Eq. 1}$$

$$Toff = r1 * cf1/A * \ln[(VH+D/A)/(VL+D/A)] \qquad \text{Eq. 2}$$

where
$A = (\alpha * r2 + \alpha * r1 - rfv * rfc * r2)/(\alpha * r2)$,
$B = (r1 * rfv * Vout - rfc * r1 * VOH)/\alpha$,
$D = (-1 * rfv * r1 * Vout - rfc * r1 * VOL)/\alpha$, and
$\alpha = r1 * rfv + rfc * rfv + rfc * r1$,
with "rfv", "rfc", "r1", and "r2" representing the resistances of the resistors Rfv, Rfc, R1, and R2, respectively, and "cf1" the capacitance of the capacitor Cf1.

Provided that $VL-VH \ll VH+B/A$, the equation Eq. 1 can be simplified as follows:

$$Ton = r1 * cf1/A * \{(VL-VH)/(-VH+B/A)\} \qquad \text{Eq. 1.1}$$

Similarly, when $VH-VL \ll VL+D/A$, the equation Eq. 2 can be simplified as follows:

$$Toff = r1 * cf1/A * \{(VH-VL)/(VL+D/A)\} \qquad \text{Eq. 2.1}$$

In practice, the switching regulator 1 may operate, for example, under the following conditions: Vout=0.6 volts (V); rfv=60 kiloohms (kΩ); rfc=1 kΩ; r1=3 megaohms (MΩ); r2=1 MΩ; cf1=1 picofarad (pF); VOH=2.5 V; VOL=0 V; VL=0.15 V; and VH=0.152 V. Substituting these parameters into the equations Eqs. 1.1 and 2.1 yields specific values of the on- and off-times Ton and Toff for the switching regulator 1, based on which an estimated operating frequency of approximately 1.5 megaherz (MHz) is obtained.

Note that the equations Eqs. 1 and 2 as well as their simplified versions Eqs. 1.1 and 2.1 do not contain the input voltage Vin. This indicates that the operating frequency of the switching regulator 1 derived from the on- and off-times Ton and Toff is intrinsically insensitive to fluctuations in the input voltage Vin.

Also note that each of the above equations Eqs. contains the output voltage Vout which can be varied by the voltage setting signal Voset in the variable-output voltage regulator 1. To maintain a constant operating frequency, the switching regulator 1 according to this patent specification adjusts the variable resistance rfv in accordance with the output voltage Vout based on a relation between Vout and rfv either theoretically calculated or obtained empirically through measurements.

Figure 5:
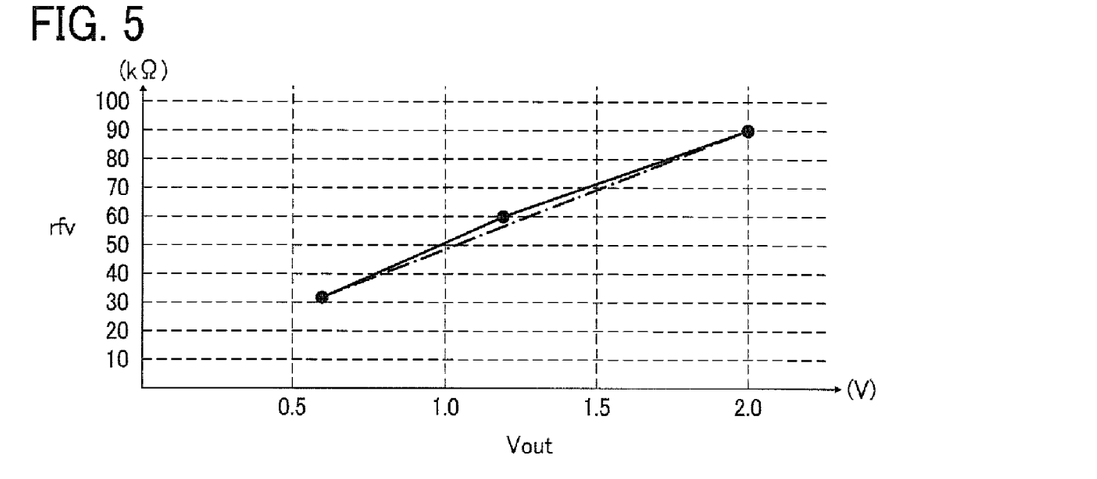
FIG. 5 is a graph showing an calculated relation between a variable resistance and an output voltage in the hysteretic switching regulator of FIG. 2.

FIG. 5 is a graph showing a calculated relation between the variable resistance rfv (in kiloohms) and the output voltage Vout (in volts) in the switching regulator 1 operating at a constant operating frequency of 2 MHz.

As shown in FIG. 5, calculated values of the resistance rfv during 2-MHz operation of the switching regulator 1 are approximately 33 kΩ, approximately 61 kΩ, and approximately 90 kΩ for output voltages Vout of 0.6 V, 1.2 V, and 2.0 V, respectively. Connecting the end points (0.6 V, 33 kΩ) and (2.0 V, 90 kΩ) of the VR graph obtains a straight line substantially coinciding with the shape of the original graph. This means that the relation between the variable resistance rfv and the output voltage Vout in the 2-MHz switching regulator 1 is well approximated by a linear function at least for Vout ranging from 0.6 V to 2.0 V.

As mentioned, the switching regulator 1 can adjust the resistance rfv of the feedback resistor Rfv according to the output voltage Vout using the externally generated signal Voset as described with reference to FIG. 3. Alternatively, such resistance adjustment may be performed using a digital signal obtained through digital-to-analog conversion of the output voltage Vout, or through an appropriate analog control circuit that varies the resistance rfv according to the actual output voltage Vout.

Figure 6:
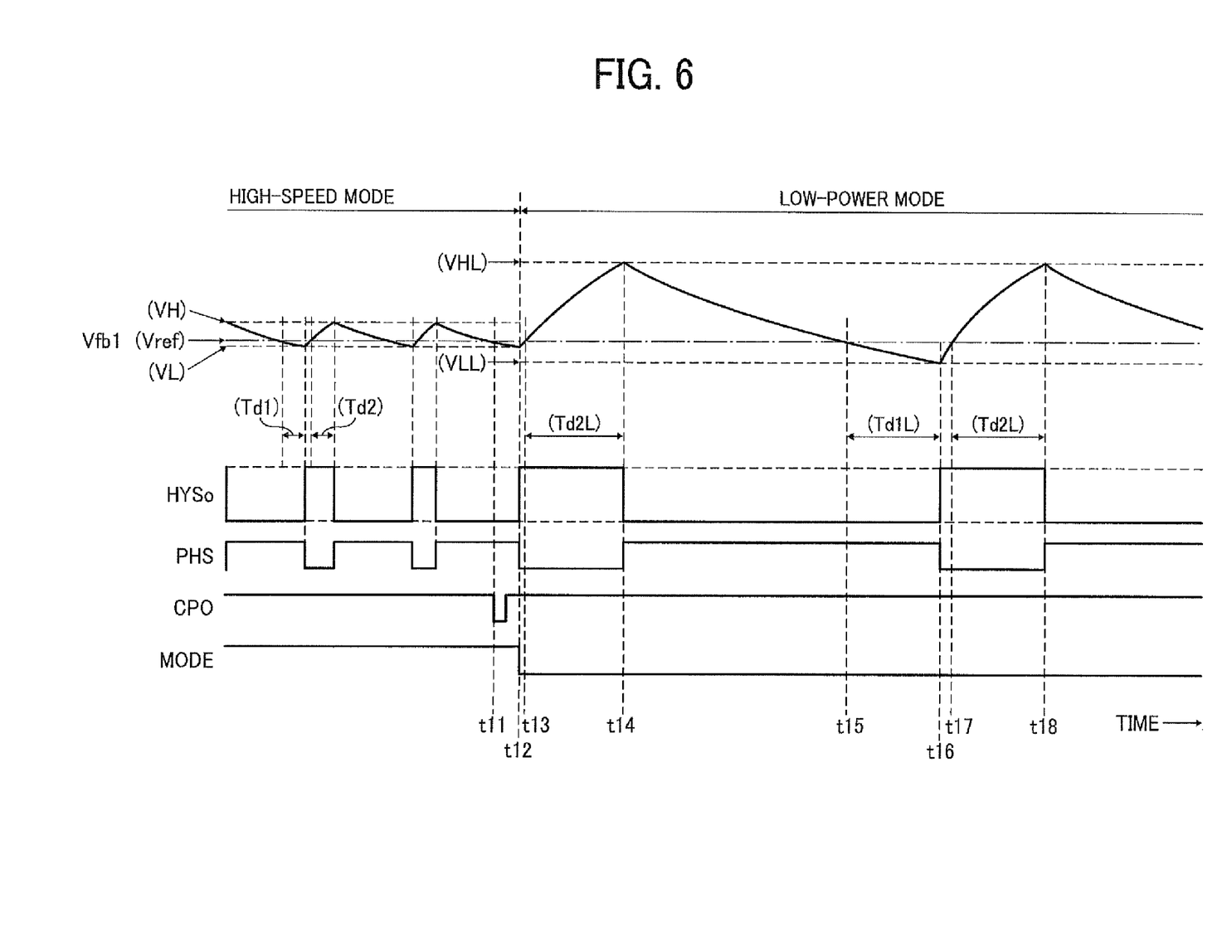
FIG. 6 is a timing chart showing waveforms of signals in the hysteretic switching regulator of FIG. 2 during transition from high-speed mode operation to low-power mode operation.

FIG. 6 is a timing chart showing waveforms of the signals Vfb, HYSo, PHS, CPO, and MODE in the hysteretic switching regulator 1 during transition from high-speed mode operation to low-power mode operation.

As shown in FIG. 6, the switching regulator 1 operates in high-speed mode when the mode switching signal MODE is high, and in low-power mode when the mode switching signal MODE is low, changing operation mode at time t12. Before time t12, the switching transistor M1 has its on-time Ton getting shorter during high-speed mode operation. This raises the average level of the first feedback voltage Vfb1 with its lower limit VL approaching the reference voltage Vref and upper limit VH well exceeding the reference voltage Vref.

At time t11, the backflow detector comparator 6 causes the output signal CPO to go low as the voltage at the switch node LX becomes positive to indicate occurrence of a current backflow through the inductor L1. In response to the backflow detection signal CPO going low, the controller 5 invalidates the enable signal LOCK to deactivate the detector comparator 6 while causing the backflow detection signal CPO to go high.

At time t12, the controller 5 causes the signal MODE to go low to enter low-power mode operation, while causing the switching control signal PHS to go low to turn on the switching transistor M1. The mode switching signal MODE going low reduces the bias current supplied to the hysteresis comparator 3 to, for example, approximately one fourth that supplied during high-speed mode operation, which in turn increases the operational delay of the comparator 3 by a factor of approximately four.

Then, the feedback voltage Vfb1 reaches the reference voltage Vref at time t13, and after a delay time Td2L, the comparator output HYSo switches from high to low at time t14.

Note that due to the fourfold operational delay of the comparator 3, the delay time Td2L for the high-to-low transition of the comparator output HYSo during low-power mode operation is approximately four times longer than the delay time Td2 during high-speed mode operation. As a result, the feedback voltage Vfb1 reaches an upper threshold VHL higher than the original upper threshold VH, with a difference between VHL and Vref approximately four times greater than a difference between VH and Vref.

After time t14, with the switching transistor M1 turned off and the synchronous rectifier transistor M2 turned on, the feedback voltage Vfb1 gradually decreases.

Then, the feedback voltage Vfb1 reaches the reference voltage Vref at time t15, and after a delay time Td1L, the comparator output HYSo switches from low to high at time t16. As in the case for the delay time Td2L, the delay time Td1L for the low-to-high transition of the comparator output HYSo during low-power mode operation is approximately four times longer than the delay time Td1 during high-speed mode operation, resulting in the feedback voltage Vfb1 reaching a lower threshold VLL lower than the original lower threshold VL, with a difference between VLL and Vref approximately four times greater than a difference between VL and Vref.

After time t16, the feedback voltage Vfb1 gradually increases with the switching transistor M1 conducting, after which the similar switching cycle is repeated to continue voltage regulation in low-power mode.

Thus, the switching regulator 1 according to this patent specification switches its operation mode from high-speed mode to low-power mode as the current supplied to the load LOAD decreases, wherein the controller 5 reduces the bias current supplied to the hysteresis comparator 3 when the backflow detector comparator 6 detects a backflow current through the synchronous rectifier transistor M2.

During transition from high-speed mode to low-power mode, reducing the comparator bias current causes the relatively long delay times Td1L and Td2L for low-to-high and high-to-low transitions of the comparator output HYSo, respectively, which in turn increases the hysteresis voltage or difference between the upper and lower thresholds VHL and VLL of the first feedback voltage Vfb1. With the feedback voltage Vfb1 having a fixed change rate, the increased hysteresis voltage extends the period of each switching cycle, meaning a reduced switching frequency and power consumed by the transistors M1 and M2, leading to high power efficiency of the switching regulator 1.

A reduction in switching power consumption is obtained in proportion to the amount or fraction by which the bias current of the hysteresis comparator 3 is reduced. For example, as in the embodiment described above, reducing the bias current to one-fourth of that used for high-speed mode operation effects a substantially fourfold reduction in switching frequency and power consumption during low-power mode operation. Such a reduction rate may be other than that used in the above embodiment, and be determined according to the specific application of the switching regulator 1.

To recapitulate, the hysteretic switching regulator 1 according to this patent specification includes the buffer 4 and the resistor Rfv forming the feedback loop circuit FL to feed the hysteresis comparator output HYSo back to the feedback voltage generator FVG, which provides the output voltage Vout with high immunity to transient load variations and an extremely small ripple voltage superimposed thereon.

In the feedback loop circuit FL, the buffer 4 energized with the constant voltage Vreg has its output BFo oscillating at a substantially constant amplitude, and the variable resistor Rfv having the resistance adjusted according to the output voltage Vout. This results in an operating frequency of the switching regulator 1 insensitive to variations in the input voltage Vin and maintained substantially constant against changes in the output voltage Vout.

Further, the hysteretic switching regulator 1 has the hysteresis comparator 3 with its hysteresis voltage Vhys determined by an operational delay of the comparator 3 and a rate of change in the first feedback voltage Vfb1. This allows for operation at high switching frequencies, leading to high power efficiency of the switching regulator 1. Still further, the hysteretic switching regulator 1 can switch its operation mode through the delay time of the hysteresis comparator 3 changing in proportion to the amount of bias current supplied to the comparator 3, i.e., entering low-power mode by reducing the comparator bias current and high-power mode by increasing the comparator bias current. This enables dual-mode operation of the switching regulator 1 without requiring a dedicated circuit for mode switching, leading to a reduction in power lost by switching the output transistors and increased power efficiency of the switching transistor 1 as a whole.

Numerous additional modifications and variations are possible in light of the above teachings. For example, in the embodiment described above, the controller 5 switches the operation mode from high-speed mode to low-power mode by reducing the comparator bias current upon detection of a backflow current by the backflow detector comparator 6. Alternatively, the controller 5 may enter low-power mode when the switching control signal PHS indicates that a current flowing through the output terminal falls below a given setpoint.

It is therefore to be understood that, within the scope of the appended claims, the disclosure of this patent specification may be practiced otherwise than as specifically described herein.

This patent specification is based on Japanese patent application No. 2008-308613 filed on Dec. 3, 2008 in the Japanese Patent Office, the entire contents of which are hereby incorporated by reference herein.

What is claimed is:

1. A non-isolated hysteretic switching regulator that converts an input voltage supplied to an input terminal into a variable output voltage output to an output terminal, the switching regulator comprising:
   a switching transistor to alternately switch on and off current flow therethrough;
   an inductor to charge at the input voltage when the switching transistor is on, and discharge when the switching transistor is off;
   a feedback voltage generator to generate a first feedback voltage at a first feedback node by dividing the output voltage;
   a hysteresis comparator circuit having a voltage comparator to compare the first feedback voltage against a reference voltage to output a comparator output signal as a result of the comparison; and
   a feedback loop circuit to feed the comparator output signal back to the feedback voltage generator to generate a second feedback voltage at a second feedback node,
   the first feedback voltage having an alternating current component substantially dependent on the second feedback voltage varying with the comparator output signal.

2. The switching regulator according to claim 1, wherein the feedback loop circuit adjusts the second feedback voltage according to the output voltage.

3. The switching regulator according to claim 2, wherein the second feedback voltage is adjusted to maintain a constant operating frequency of the switching regulator.

4. The switching regulator according to claim 1, wherein the feedback voltage generator includes:
   a first feedback resistor connected between the output terminal and the second feedback node;
   a pair of voltage divider resistors connected in series, one between the first and second feedback nodes, and the other between the first feedback node and a ground terminal; and
   a feedback capacitor connected between the output terminal and the first feedback node,
   the feedback loop circuit supplying therethrough the comparator output signal to the second feedback node.

5. The switching regulator according to claim 4, wherein the feedback loop circuit includes:
   a buffer having an input thereof connected to an output of the voltage comparator to generate a buffered signal from the comparator output signal at an output thereof; and
   a variable, second feedback resistor connected between the second feedback node and the buffer output and having a control terminal to receive a resistance control signal to adjust a variable resistance thereof according the output voltage.

6. The switching regulator according to claim 5, wherein the variable resistance is adjusted to maintain a constant operating frequency of the switching regulator.

7. The switching regulator according to claim 5, wherein the resistance control signal comprises an externally supplied, voltage setting signal according to which the hysteresis comparator circuit adjusts the reference voltage to set the output voltage to a desired level.

8. The switching regulator according to claim 5, further comprising a constant voltage circuit to supply a constant voltage to energize the buffer.

9. The switching regulator according to claim 8, wherein the buffered signal has a constant amplitude.

10. The switching regulator according to claim 1, further comprising:
    a controller to generate a switching control signal to control operation of the switching transistor based on the comparator output signal,
    wherein the controller reduces a bias current supplied to the voltage comparator when the switching control signal indicates that a current flowing through the output terminal falls below a given setpoint.

11. The switching regulator according to claim 1, further comprising:
    a synchronous rectifier transistor to alternately switch on and off current flow therethrough,
    the switching transistor turning on when the synchronous rectifier transistor is off to charge the inductor, and the synchronous rectifier transistor turning on when the switching transistor is off to discharge the inductor;
    a controller to generate a switching control signal to control operation of the switching transistor and a rectification control signal to control operation of the synchronous rectifier transistor based on the comparator output signal; and
    a backflow current detector to detect a backflow current flowing from the inductor toward the synchronous rectifier transistor,
    wherein the controller reduces a bias current supplied to the voltage comparator upon detection of a backflow current by the backflow current detector.

12. The switching regulator according to claim 1, wherein the voltage comparator exhibits hysteresis determined by an operational delay of the voltage comparator and a rate of change of the first feedback voltage.

13. A non-isolated hysteretic switching regulator that converts an input voltage supplied to an input terminal into an output voltage output to an output terminal, the switching regulator comprising:
    a switching transistor to alternately switch on and off current flow therethrough,
    an inductor to charge at the input voltage when the switching transistor is on, and discharge when the switching transistor is off;
    a feedback voltage generator to generate a first feedback voltage at a first feedback node by dividing the output voltage;
    a hysteresis comparator circuit having a voltage comparator to compare the first feedback voltage against a reference voltage to output a comparator output signal as a result of the comparison; and
    a feedback loop circuit to feed the comparator output signal back to the feedback voltage generator to generate a second feedback voltage at a second feedback node,
    the first feedback voltage having an alternating current component substantially dependent on the second feedback voltage varying with the comparator output signal.

14. The switching regulator according to claim 13, wherein the feedback voltage generator includes:

a first feedback resistor connected between the output terminal and the second feedback node;
a pair of voltage divider resistors connected in series, one between the first and second feedback nodes, and the other between the first feedback node and a ground terminal; and
a feedback capacitor connected between the output terminal and the first feedback node,
the feedback loop circuit supplying therethrough the comparator output signal to the second feedback node.

15. The switching regulator according to claim 13, further comprising:
a controller to generate a switching control signal to control operation of the switching transistor based on the comparator output signal,
wherein the controller reduces a bias current supplied to the voltage comparator when the switching control signal indicates that a current flowing through the output terminal falls below a given setpoint.

16. The switching regulator according to claim 13, further comprising:
a synchronous rectifier transistor to alternately switch on and off current flow therethrough,
the switching transistor turning on when the synchronous rectifier transistor is off to charge the inductor, and the synchronous rectifier transistor turning on when the switching transistor is off to discharge the inductor;
a controller to generate a switching control signal to control operation of the switching transistor and a rectification control signal to control operation of the synchronous rectifier transistor based on the comparator output signal; and
a backflow current detector to detect a backflow current flowing from the inductor toward the synchronous rectifier transistor,
wherein the controller reduces a bias current supplied to the voltage comparator upon detection of a backflow current by the backflow current detector.

17. The switching regulator according to claim 13, wherein the voltage comparator exhibits hysteresis determined by an operational delay of the voltage comparator and a rate of change of the first feedback voltage.

18. A control method for use in a non-isolated hysteretic switching regulator that converts an input voltage supplied to an input terminal into a variable output voltage output to an output terminal,
the switching regulator including:
a switching transistor to alternately switch on and off current flow therethrough according to a switching control signal applied to a control terminal thereof,
an inductor to charge at the input voltage when the switching transistor is on, and discharge when the switching transistor is off; and
a rectifier to pass current flow therethrough when the inductor discharges,
the method comprising:
generating a first feedback voltage by dividing the output voltage through multiple resistors connected in series;
comparing the first feedback voltage against a reference voltage to output a result of the comparison;
generating the switching control signal based on the comparison result; and
feeding the comparison result back to the feedback voltage generation to generate a second feedback voltage,
the first feedback voltage having an alternating current component substantially dependent on the second feedback voltage varying with the comparison result.

19. The control method according to claim 18, further comprising adjusting the second feedback voltage according to the output voltage.

20. The control method according to claim 19, wherein the second feedback voltage is adjusted to maintain a constant operating frequency of the switching regulator.

* * * * *